ELECTRONIC STEPPING SWITCH ARRANGEMENT
Filed April 15, 1963
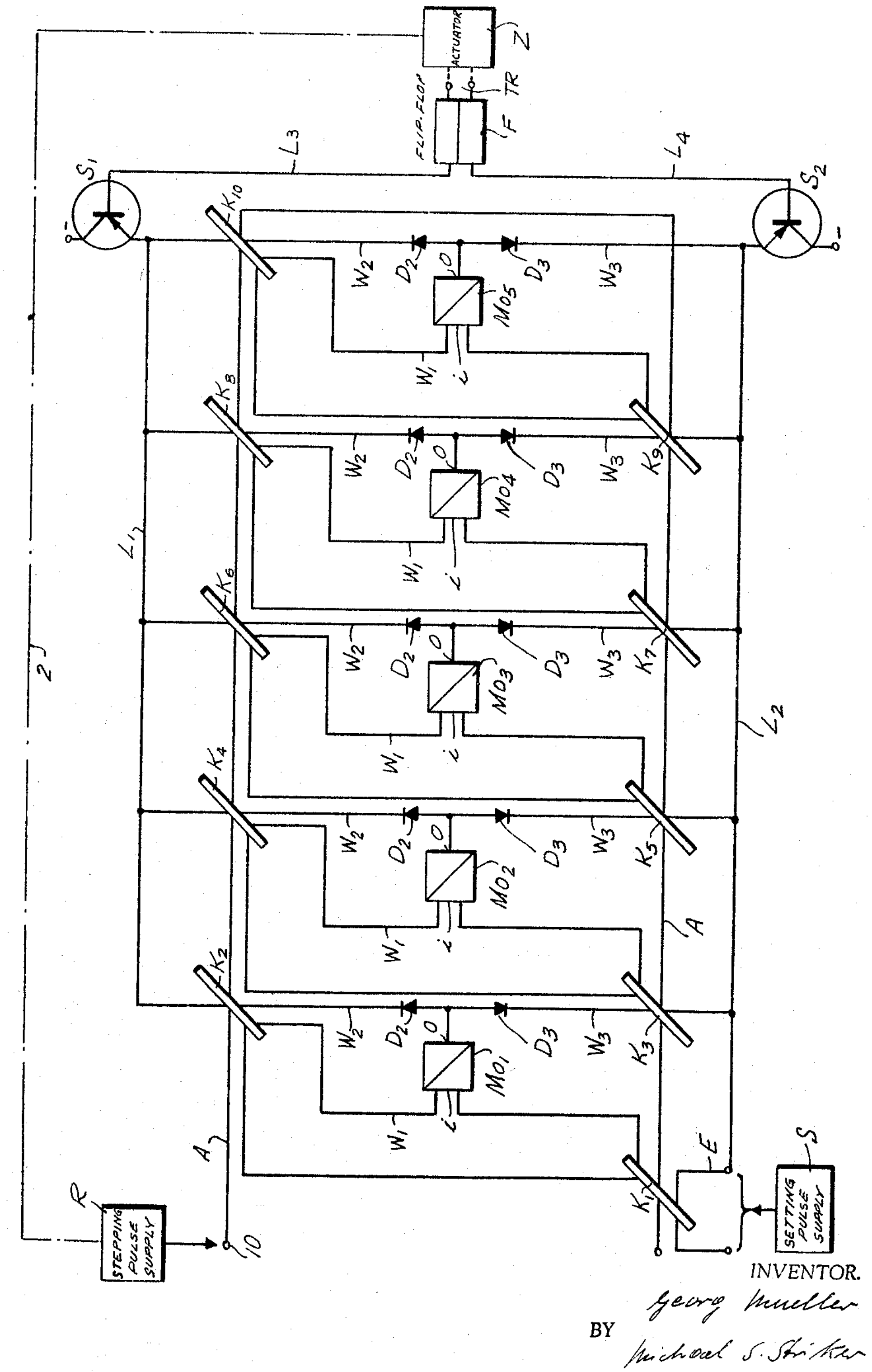
INVENTOR.
Georg Mueller
BY
Michael S. Striker
Attorney United States Patent Office 3,270,210
Patented August 30, 1966

3,270,210

ELECTRONIC STEPPING SWITCH ARRANGEMENT

Georg Mueller, Schwabach, Germany, assignor to Max Grundig, Furth, Bavaria, Germany Filed Apr. 15, 1963, Ser. No. 273,173
Claims priority, application Germany, Apr. 18, 1962, G 34,764
20 Claims. (Cl. 307—88)

The present invention concerns an electronic stepping switch arrangement comprising a plurality of monostable circuit means serving as stepping control stages and being operatively connected with magnet core means.

In conventional electronic stepping switch arrangements of this type the monostable stages are so connected with the various magnet core means that one monostable stage or circuit means is required for each stage of the stepping switch arrangement i.e. one monostable stage for each magnet core means. It is therefore a disadvantage of this conventional arrangement that the individual monostable stage or circuit which is the most expensive element of such a stepping switch arrangement, is used only once during one switching cycle of the arrangement involving all the stages thereof.

It is therefore one object of this invention to provide for an electronic stepping switch arrangement which is free of the above stated drawback of conventional arrangements and which therefore requires for a given number of stages only a smaller number of monostable circuit means.

It is a further object of this invention to provide for an improved electronic stepping switch arrangement which is comparatively simple in construction and entirely reliable in operation.

With above objects in view the invention includes an electronic stepping switch arrangement of the general type set forth but including circuit means and switching means by means of which during a stepping cycle of the arrangement each individual monostable circuit means is consecutively operatively connected with different ones of a plurality of the magnet core means.

More particularly the invention includes an electronic stepping switch arrangement which comprises, in combination, a series of magnet core means changeable between a first and a second magnetized condition by application of electric pulses; a plurality of monostable circuit means serving as stepping control stages and each being operatively connected with a different group of said magnetic core means for being triggered by an input pulse generated by one of said magnetic core means of such group when the magnetized condition of said core means thereof is changed, and for changing, in response to being so triggered, by application of an output pulse the magnetized condition of another one of said magnetic core means of such group; read-out means for applying stepping impulses to said plurality of magnetic core means for causing generation of said input pulses; electronic switching means operatively connected with all of said monostable circuit means and changeable between two alternate switching conditions for consecutively causing, depending upon said switching condition thereof, the output pulses of the individual monostable circuit means to be applied to alternatingly different ones of said magnetic core means of the respective group thereof; and actuating means for sequentially actuating said electronic switching means so as to change between said alternate switching conditions alternatingly with the application of said stepping pulses.

In a preferred embodiment of the invention the electronic switching means comprise switching transistors which are controlled by a flip-flop circuit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which an arrangement according to the invention is illustrated as a schematic circuit diagram.

The illustrated diagram represents an electronic stepping switch arrangement according to the invention which comprises five monostable circuit means $Mo_1$ to $Mo_5$ of conventional design and which may be e.g. blocking oscillators. Each of the monostable circuit means $Mo_1$ to $Mo_5$ is in accordance with the basic concept of the invention operatively connected with a plurality i.e. a group of magnet core means, namely three magnet core means in the illustrated example, by means of an equal number of windings, in the present example by the windings $w_1$, $w_2$ and $w_3$. As can be seen the cores are so associated with the individual monostable circuit means that each third core out of a group thereof associated with a particular monostable circuit constitutes at the same time the first magnet core of a group thereof associated with the next following monostable circuit so that in this manner ten magnet cores $K_1$ to $K_{10}$ are controlled by only five monostable stages or circuits $Mo_1$ to $Mo_5$.

Each monostable stage has an input side $i$ and an output side $o$. The input side $i$ is connected with a trigger winding $w_1$ by means of which it is coupled inductively with two magnet cores. As is well known, these magnet cores may be changed by application of electric pulses between a first and a second magnetized condition. When such change takes place in either one of the two cores coupled with the input of a particular monostable circuit means a trigger pulse is produced in the winding $w_1$ whereby the monostable circuit is caused to issue an output pulse from its output $o$. As can be seen the input $i$ of the monostable stage $Mo_1$ is coupled with the magnet cores $K_1$ and $K_2$, the input $i$ of the stage $Mo_2$ is coupled with the cores $K_3$ and $K_4$, the stage $Mo_3$ is coupled with the cores $K_5$ and $K_6$, the stage $Mo_4$ is coupled with the cores $K_7$ and $K_8$, and finally the stage $Mo_5$ is coupled with the cores $K_9$ and $K_{10}$. In order to read out the cores and in order to produce a change between said different magnetized conditions thereof wherever possible a read-out line A is provided which passes through all the cores $K_1$ to $K_{10}$ so that reading out the cores can be accomplished by applying a stepping pulse from a stepping pulse supply R to the terminal 10 of the read-out line A so that such a stepping pulse will be applied to all of the magnet cores and have the desired effect wherever a magnet core is ready for changing its type of magnetization.

The output side $o$ of each of the monostable stages or circuits $Mo_1$ to $Mo_5$ is connected with two magnetizing windings $w_2$ and $w_3$. Of these magnetizing windings all the windings $w_2$ are connected in parallel with a bus bar line $L_1$, while all the windings $w_3$ are connected in parallel with another bus bar line $L_2$. It is to be noted that each of the magnetizing windings $w_2$ is taken through one of the two cores which are both coupled by line $w_1$ with the particular monostable stage, while the winding $w_3$ is taken through the respectively opposite one of the two cores which are coupled by a trigger winding $w_1$ with the input $i$ of the next following monostable stage or circuit.

Consequently, the circuit arrangement is as follows: The trigger winding $w_1$ of the monostable stage $Mo_1$ is taken through the magnet cores $K_1$ and $K_2$ while the magnetizing winding $w_2$ is taken through the core $K_2$ and the magnetizing winding $w_3$ is taken through the core $K_3$ which however is coupled by the trigger winding $w_1$ of the following monostable stage $Mo_2$ with the core $K_4$. The magnetizing winding $w_2$ of the monostable stage $Mo_2$ is taken through the core $K_4$ while the related magnetizing winding $w_3$ of the same monostable stage is taken through the core $K_5$. The core $K_5$ is coupled by the trigger winding $w_1$ of the monostable stage $Mo_3$ with the core $K_6$ through which also the magnetizing winding $w_2$ of the next following monostable stage $Mo_3$ is taken. The other magnetizing winding $w_3$ of this particular monostable stage is taken through the core $K_7$ which is coupled by the trigger winding $w_1$ of the following monostable stage $Mo_4$ with the core $K_8$. The magnetizing winding $w_2$ of this stage $Mo_4$ is taken through the core $K_8$ while the related magnetizing winding $w_3$ is taken through the core $K_9$ through which also the trigger winding $w_1$ of the next following monostable stage $Mo_5$ is taken. Finally, the core $K_{10}$ is coupled by the trigger winding $w_1$ with the core $K_9$ and with the input of the monostable stage $Mo_5$.

In order to control the output signals from the individual monostable stages and to cause them to pass alternatingly through the magnetizing windings $w_2$ and $w_3$, respectively, diodes $D_2$ are connected in the windings $w_2$ and diodes $D_3$ are connected in the magnetizing windings $w_3$, and moreover the bus bar line $L_1$ associated with all the windings $w_2$ is connected with the emitter of a switching transistor $S_1$, while similarly the bus bar line $L_2$ associated with all the windings $w_3$ is connected with the emitter of a second switching transistor $S_2$. The collectors of these two transistors are connected to negative potential, while the bases of the transistors $S_1$ and $S_2$ are connected by lines $L_3$ and $L_4$, respectively, with the outputs of a conventional flip-flop circuit F. Depending upon the condition of conductivity of the two portions of the flip-flop circuit F either the transistor $S_1$ or the transistor $S_2$ is in conductive condition. Thus the flip-flop circuit controls the application of output pulses from any one of the monostable stages to either the pertaining magnetizing winding $w_2$ or to the pertaining magnetizing winding $w_3$. The flip-flop circuit F is controlled in a conventional manner by some actuator Z which applies trigger impulses when required to the trigger pulse input terminals TR of the flip-flop circuit F. The actuator Z is connected by conventional means, indicated diagrammatically by the dash-dotted line $z$ with the stepping pulse supply R in order to provide for a suitable time relation between the application of a stepping pulse by the stepping pulse supply R and the application of a trigger pulse by the actuator Z.

In order to be able to place the first magnet core $K_1$ of the arrangement in a desired condition of magnetization, the core $K_1$ is provided with a special magnetizing winding E connected with a setting pulse supply S whereby the whole arrangement can be set for a starting condition by the proper magnetization of the first magnet core $K_1$.

In operation, a stepping cycle of the arrangement is as follows: As mentioned above, by the application of a setting pulse to the winding E the magnet core $K_1$ is magnetized to what may be called its first or "storing" magnetized condition while all the other cores are in the opposite magnetized condition. It is further assumed that a trigger impulse has placed the flip-flop circuit F and thereby the switching transistors $S_1$ and $S_2$ in starting condition. This means that the switching transistor $S_1$ is rendered conductive while the switching transistor $S_2$ is in non-conductive condition. In order now to cause a step of the switching arrangement a stepping pulse is applied by the stepping pulse supply R to the terminal 10 of the read-out line A which is effective for all the cores $K_1$ to $K_{10}$. However, since only one of these cores, namely the core $K_1$, has been magnetized to "storing" condition only this one core $K_1$ will be changed back to the opposite magnetized condition whereby an input pulse is generated in the trigger winding $w_1$ of the monostable stage $Mo_1$ which is applied to the input $i$ thereof so as to trigger this monostable stage $Mo_1$. Consequently the stage $Mo_1$ delivers at its output $o$ and output pulse which, since the switching transistor $S_2$ is in non-conductive condition while the transistor $S_1$ is conductive, is applied via the magnetizing winding $w_2$ of the stage $Mo_1$ to the core $K_2$ so as to change the magnetization of the latter. The monostable stages are so constructed and dimensioned that each such output impulse lasts longer than the stepping pulse applied to the read-out line A so that the core $K_2$ remains in the condition produced by the application of the output pulse after both the stepping pulse and the output pulse have been terminated.

After the magnetization of the core $K_2$ has been changed a further trigger pulse is applied by the actuator Z to the input TR of the flip-flop circuit F whereby the latter is switched to its second state. Hereby also the conductive conditions of the switching transistor $S_1$ and $S_2$ are changed so that now the transistor $S_1$ is in non-conductive condition and the transistor $S_2$ is in conductive condition. In accordance with the alternating action of the devices Z and R now another stepping pulse is applied by the stepping pulse supply R to the read-out line A whereby now the only core in changed magnetized condition namely the core $K_2$ is returned to its previous magnetized condition whereby an input pulse is produced in the trigger winding $w_1$ of the monostable stage $Mo_1$ whereby this stage is again triggered and caused to deliver at its output $o$ another output pulse. However, this output pulse is now applied via the winding $w_3$ to the core $K_3$ for changing its magnetized condition, because the other magnetizing winding $w_2$ is blocked via the bus bar line $L_1$ through the switching transistor $S_1$. Again the output pulse in the magnetizing line $w_3$ of the monostable stage $Mo_1$ lasts longer than the last mentioned stepping pulse in the readout line A so that after the termination of both pulses the core $K_3$ remains in its changed magnetized condition.

In a similar manner a following trigger impulse applied to the flip-flop F causes the switching transistor $S_2$ to return to non-conductive condition and to cause the switching transistor $S_1$ to return to conductive condition. The next following stepping pulse through line A will change the core $K_3$ to opposite magnetized condition whereby again an input pulse is produced in the trigger winding $w_1$ of the monostable stage $Mo_2$ so as to trigger the latter. It can be seen that now several magnet cores have been consecutively changed between first and second magnetized condition while only two monostable stages have been involved. The operation proceeds in a similar manner so that by an output impulse delivered by the monostable stage $Mo_2$ the magnetization of the core $K_4$ is changed because the winding $w_3$ of this stage is blocked via the bus bar line $L_2$ and the non-conductive switching transistor $S_2$. Hereafter a trigger pulse again changes the switching position of the flip-flop circuit whereafter the magnetization of the next following core $K_5$ is changed. The same procedure repeats analogously from stage to stage until via the magnetizing winding $w_3$ of the last monostable stage $Mo_5$ no change of the magnetized condition of any magnet core is effected any more. When this situation has been reached then the electronic stepping switch arrangement as illustrated and described has carried out all the switching steps through all the stages thereof. Now the whole arrangement may be set again for starting a new cycle by application of a setting pulse from the setting pulse supply S to the winding E of the first magnet core $K_1$.

It will be understood that each of the elements described above, or two or more together, may also find a useful application in other types of an electronic stepping switch arrangement differing from the types described above.

While the invention has been illustrated and described as embodied in an electronic stepping switch arrangement comprising a plurality of monostable circuit means cooperating each with a plurality of magnet core means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Electronic stepping switch arrangement, comprising, in combination, a series of magnet core means changeable between a first and a second magnetized condition by application of electric pulses; a plurality of monostable circuit means serving as stepping control stages and each being operatively connected with a different group of said magnetic core means for being triggered by an input pulse generated by one of said magnetic core means of such group when the magnetized condition of said core means thereof is changed, and for changing, in response to being so triggered, by application of an output pulse the magnetized condition of another one of said magnetic core means of such group; read-out means for applying stepping impulses to said plurality of magnetic core means for causing generation of said input pulses; electronic switching means operatively connected with all of said monostable circuit means and changeable between two alternate switching conditions for consecutively causing, depending upon said switching condition thereof, the output pulses of the individual monostable circuit means to be applied to alternatingly different ones of said magnetic core means of the respective group thereof; and actuating means for sequentially actuating said electronic switching means so as to change between said alternate switching conditions alternatingly with the application of said stepping pulses.

2. Electronic stepping switch arrangement, comprising, in combination, a series of magnet core means changeable between a first and a second magnetized condition by application of electric pulses; a plurality of monostable circuit means serving as stepping control stages and each being operatively connected with a different group of said magnetic core means for being triggered by an input pulse generated by one of said magnetic core means of such group when the magnetized condition of said core means thereof is changed, and for changing, in response to being so triggered, by application of an output pulse the magnetized condition of another one of said magnetic core means of such group; read-out means for applying stepping impulses to said plurality of magnetic core means for causing generation of said input pulses; electronic switch means comprising switching transistor means operatively connected with said monostable circuit means and changeable between two alternate switching conditions for consecutively causing, depending upon said switching condition thereof, the output pulses of the individual monostable circuit means to be applied to alternatingly different ones of said magnetic core means of the respective group thereof; and actuating means comprising flip-flop circuit means for sequentially actuating said electronic switching means so as to change between said alternate switching conditions alternatingly with the application of said stepping pulses.

3. An arrangement according to claim 1 wherein trigger winding means are provided for each of said monostable circuit means, respectively, for coupling the latter at its input side inductively with a plurality of said magnet core means for triggering the respective monostable circuit means by an input pulse generated by any one of said magnet core means coupled therewith, and wherein a plurality of magnetizing windings is connected with the output of each of said monostable circuit means, each magnetizing winding being coupled with a different one of said magnet core means for changing the magnetized condition thereof by application of an output pulse when the particular monostable circuit means is triggered.

4. An arrangement according to claim 3, wherein consecutive ones of said monostable circuit means are respectively associated with consecutive ones of said magnet core means in an alternating pattern by means of said magnetizing winding coupled with a particular magnetic core means being connected with the output of the preceding monostable circuit means and said trigger winding coupled with said particular magnetic core means being connected with the input of the next following monostable circuit means.

5. An arrangement according to claim 3, wherein said electronic switching means comprise first and second switching transistor means, said first transistor means being connected with one group of said magnetizing windings for rendering the latter operative and responsive to application of an output pulse to any one thereof only when said first transistor means is in conductive condition, and said second transistor means being connected with a second group of said magnetizing windings for rendering the latter operative and responsive to application of an output pulse to any one thereof only when said second transistor means is in conductive condition, diode means being arranged in each of said magnetizing windings, respectively, for permitting only unidirectional flow of said output pulses through that one of said magnetizing windings which is connected with that one of said switching transistor means which is in conductive condition.

6. An arrangement according to claim 3, wherein the first one of said series of magnet core means comprises a separate magnetizing winding for changing the magnetized condition thereof independently of said monostable circuit means.

7. An arrangement according to claim 1, wherein said monostable circuit means are so constructed that an output pulse delivered thereby has a duration exceeding that of a stepping impulse applied by said read-out means substantially simultaneously with the triggering of said monostable circuit means which causes the particular output pulse to be issued.

8. An arrangement according to claim 3, wherein said electronic switching means comprise first and second switching transistor means, said first transistor means being connected with one group of said magnetizing windings for rendering the latter operative and responsive to application of an output pulse to any one thereof only when said first transistor means is in conductive condition, and said second transistor means being connected with a second group of said magnetizing windings for rendering the latter operative and responsive to application of an output pulse to any one thereof only when said second transistor means is in conductive condition.

9. An arrangement according to claim 4, wherein said electronic switching means comprise first and second switching transistor means, said first transistor means being connected with one group of said magnetizing windings for rendering the latter operative and responsive to application of an output pulse to any one thereof only when said first transistor means is in conductive condition, and said second transistor means being connected with a second group of said magnetizing windings for rendering the latter operative and responsive to application of an output pulse to any one thereof only when said second transistor means is in conductive condition, diode means being arranged in each of said magnetizing windings, respectively, for permitting only unidirectional flow of said output pulses through that one of said magnetizing windings which is connected with that one of said switching transistor means which is in conductive condition.

10. An arrangement according to claim 4, wherein the first one of said series of magnet core means comprises a separate magnetizing winding for changing the magnetized condition thereof independently of said monostable circuit means.

11. An arrangement according to claim 5, wherein the first one of said series of magnet core means comprises a separate magnetizing winding for changing the magnetized condition thereof independently of said monostable circuit means.

12. An arrangement according to claim 9, wherein the first one of said series of magnet core means comprises a separate magnetizing winding for changing the magnetized condition thereof independently of said monostable circuit means.

13. An arrangement according to claim 3, wherein said monostable circuit means are so constructed that an output pulse delivered thereby has a duration exceeding that of a stepping impulse applied by said read-out means substantially simultaneously with the triggering of said monostable circuit means which causes the particular output put pulse to be issued.

14. An arrangement according to claim 4, wherein said monostable circuit means are so constructed that an output pulse delivered thereby has a duration exceeding that of a stepping impulse applied by said read-out means substantially simultaneously with the triggering of said monostable circuit means which causes the particular output pulse to be issued.

15. An arrangement according to claim 9, wherein said monostable circuit means are so constructed that an output pulse delivered thereby has a duration exceeding that of a stepping impulse applied by said read-out means substantially simultaneously with the triggering of said monostable circuit means which causes the particular output pulse to be issued.

16. An arrangement according to claim 12, wherein said monostable circuit means are so constructed that an output pulse delivered thereby has a duration exceeding that of a stepping impulse applied by said read-out means substantially simultaneously with the triggering of said monostable circuit means which causes the particular output pulse to be issued.

17. In an electronic stepping switch arrangement including a series of magnet core means and a series of monostable control circuit means for changing the magnetized condition of selected ones of said magnet core means when triggered by an impulse generated by a different one of said magnet core means, in combination, circuit means inductively coupling each of said monostable control circuit means with a respectively associated different group combination of magnet core means out of said series thereof; change-over switch means changeable between at least a first and a second condition and selectively permitting, when in said first condition, any one of said monostable control circuit means to change the magnetized condition of one magnet core means out of the respective group thereof associated with the particular monostable control circuit means, and permitting, when in said second condition, any one of said monostable control circuit means to change the magnetized condition of a different magnet core means out of the respective group thereof associated with the particular monostable control circuit means; and actuating means for alternatingly changing said change-over switch means between said first and second conditions thereof.

18. In an electronic stepping switch arrangement including a series of magnet core means and a series of monostable control circuit means for changing the magnetized condition of selected ones of said magnet core means when triggered by an impulse generated by a different one of said magnet core means, in combination, circuit means inductively coupling each of said monostable control circuit means with a respectively associated different group combination of magnet core means out of said series thereof; electronic change-over switch means changeable between at least a first and second condition and selectively permitting, when in said first condition, any one of said monostable control circuit means to change the magnetized condition of one magnet core means out of the respective group thereof associated with the particular monostable control circuit means, and permitting, when in said second condition, any one of said monostable control circuit means to change the magnetized condition of a different magnet core means out of the respective group thereof associated with the particular monostable control circuit means; and electronic actuating means for alternatingly changing said change-over switch means between said first and second conditions thereof.

19. In an electronic stepping switch arrangement including a series of magnet core means and a series of monostable control circuit means for changing the magnetized condition of selected ones of said magnet core means when triggered by an impulse generated by a different one of said magnet core means, in combination, circuit means inductively coupling each of said monostable control circuit means with a respectively associated different group combination of magnet core means out of said series thereof; electronic change-over switch means including at least two switching transistor means each changeable between a conductive and non-conductive condition and selectively permitting, when one of said transistor means is in said conductive condition, any one of said monostable control circuit means to change the magnetized condition of one magnet core means out of the respective group thereof associated with the particular monostable control circuit means, and permitting, when the other one of said transistor means is in conductive condition, any one of said monostable control circuit means to change the magnetized condition of a different magnet core means out of the respective group thereof associated with the particular monostable control circuit means; and electronic actuating means for alternatingly changing said change-over switch means between said first and second conditions thereof.

20. In an electronic stepping switch arrangement including a series of magnet core means and a series of monostable control circuit means for changing the magnetized condition of selected ones of said magnet core means when triggered by an impulse generated by a different one of said magnet core means, in combination, circuit means inductively coupling each of said monostable control circuit means with a respectively associated different group combination of magnet core means out of said series thereof; electronic change-over switch means including at least two switching transistor means each changeable between a conductive and non-conductive condition and selectively permitting, when one of said transistor means is in said conductive condition, any one of said monostable control circuit means to change the magnetized condition of one magnet core means out of the respective group thereof associated with the particular monostable control circuit means, and permitting, when the other one of said transistor means is in conductive condition, any one of said monostable control circuit means to change the magnetized condition of a different magnet core means out of the respective group thereof associated with the particular monostable control circuit means; and electronic actuating means including flip-flop means for alternatingly changing said switching transistor means between said first and second conditions thereof.

References Cited by the Examiner

UNITED STATES PATENTS

| | | | |
|---|---|---|---|
| 3,160,862 | 12/1964 | Adams | 340—174 |
| 3,181,130 | 4/1965 | Newton | 340—174 |

BERNARD KONICK, *Primary Examiner.*

S. M. URYNOWICZ, J. MOFFITT, *Assistant Examiners.*